(12) United States Patent
Vest (10) Patent No.: US 9,970,297 B2
(45) Date of Patent: *May 15, 2018

(54) COMPOSITE FAN SLIDER WITH NANO-COATING

(71) Applicant: Rolls-Royce Corporation, Indianapolis, IN (US)

(72) Inventor: Wade A. Vest, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/832,296

(22) Filed: Aug. 21, 2015

(65) Prior Publication Data

US 2016/0061040 A1 Mar. 3, 2016

Related U.S. Application Data (60) Provisional application No. 62/043,776, filed on Aug. 29, 2014.

(51) Int. Cl.
| | | |
|---|---|---|
| *F01D 5/30* | (2006.01) | |
| *F01D 5/02* | (2006.01) | |
| *C25D 1/02* | (2006.01) | |
| *C25D 1/08* | (2006.01) | |
| *C25D 5/56* | (2006.01) | |

(Continued)

(52) U.S. Cl.
CPC ............... *F01D 5/02* (2013.01); *C25D 1/02* (2013.01); *C25D 1/08* (2013.01); *C25D 5/56* (2013.01); *F01D 5/323* (2013.01); *F01D 25/005* (2013.01); *F04D 29/023* (2013.01); *F04D 29/322* (2013.01); *F05D 2220/36* (2013.01); *F05D 2230/24* (2013.01); *F05D 2230/90* (2013.01); *F05D 2250/191* (2013.01); *F05D 2300/17* (2013.01); *F05D 2300/433* (2013.01);

(Continued)

(58) Field of Classification Search
CPC .......... F01F 5/30; F01F 5/3007; F01F 5/3092; F01F 5/26; F01D 5/02; F01D 5/323; F01D 25/005; F01D 5/147; C25D 1/02; C25D 1/08; C25D 5/56; F04D 29/023; F04D 29/322; F05D 2220/36; F05D 2230/24; F05D 2230/90; F05D 2250/191; F05D 2300/17; F05D 2300/433; F05D 2300/436; F05D 2300/605; Y02T 50/671
USPC .............................................. 164/46; 205/80
See application file for complete search history.

(56) References Cited

U.S. PATENT DOCUMENTS

| 3,986,779 A | 10/1976 | Beckershoff |
| 4,478,554 A | 10/1984 | Surdi |

(Continued)

FOREIGN PATENT DOCUMENTS

EP 2014873 1/2009

OTHER PUBLICATIONS

European Search Report, European Application No. 15182617.9-1359, search completed Nov. 19, 2015, 8 pages.

(Continued)

*Primary Examiner* — Kenneth Bomberg
*Assistant Examiner* — Brian Delrue
(74) *Attorney, Agent, or Firm* — Barnes & Thornburg LLP (57) ABSTRACT

A fan slider for use in a fan assembly to push a fan blade radially outward of a rotating axis of the gas turbine engine. The fan slider may include a fan slider body coated with a nanocrystalline metallic coating and a slider spring.

16 Claims, 5 Drawing Sheets

(51) Int. Cl.
  *F04D 29/32* (2006.01)
  *F01D 25/00* (2006.01)
  *F04D 29/02* (2006.01)
  *F01D 5/32* (2006.01)

(52) U.S. Cl.
  CPC .. *F05D 2300/436* (2013.01); *F05D 2300/605* (2013.01); *Y02T 50/671* (2013.01)

(56) References Cited

U.S. PATENT DOCUMENTS

| | | | |
|---|---|---|---|
| 4,526,841 A * | 7/1985 | Yamatsuta | B22D 19/14 164/97 |
| 5,240,375 A | 8/1993 | Wayte | |
| 5,273,782 A * | 12/1993 | Sagawa | C23C 24/045 205/80 |
| 6,109,877 A | 8/2000 | Gekht et al. | |
| 6,837,686 B2 | 1/2005 | Di Paola et al. | |
| 7,530,254 B2 | 5/2009 | Bilstein et al. | |
| 7,806,662 B2 | 10/2010 | Gekht et al. | |
| 8,459,954 B2 | 6/2013 | Anderson et al. | |
| 2002/0185770 A1 * | 12/2002 | McKague | B29C 70/14 264/108 |
| 2003/0194318 A1 * | 10/2003 | Duesler | F01D 5/326 416/2 |
| 2003/0194321 A1 * | 10/2003 | Barnette | F01D 5/3092 416/220 R |
| 2003/0228466 A1 * | 12/2003 | Wei | B05D 1/62 428/408 |
| 2004/0013528 A1 * | 1/2004 | Leathart | F01D 5/323 416/220 R |
| 2005/0192364 A1 * | 9/2005 | Lichtenhan | C23C 18/1212 521/50 |
| 2006/0127583 A1 * | 6/2006 | Lichtenhan | B05D 3/0453 427/331 |
| 2007/0259116 A1 * | 11/2007 | Nolan | B05D 1/32 427/282 |
| 2008/0250722 A1 * | 10/2008 | Sung | B24D 18/00 451/540 |
| 2009/0053486 A1 * | 2/2009 | Cooke | C23C 18/32 428/209 |
| 2009/0121709 A1 * | 5/2009 | Gazit | A61K 47/48869 324/207.13 |
| 2009/0301889 A1 * | 12/2009 | Reents | C25D 3/38 205/96 |
| 2009/0301891 A1 * | 12/2009 | Locktman | C25D 7/0614 205/125 |
| 2010/0038121 A1 * | 2/2010 | Kosowsky | C25D 1/00 174/257 |
| 2010/0181477 A1 * | 7/2010 | Okoli | G01M 11/08 250/307 |
| 2010/0261034 A1 * | 10/2010 | Cardarelli | A61L 27/42 428/615 |
| 2012/0082541 A1 | 4/2012 | Macchia et al. | |
| 2012/0082551 A1 | 4/2012 | Macchia et al. | |
| 2012/0082553 A1 * | 4/2012 | Eleftheriou | F01D 5/147 416/224 |
| 2012/0082559 A1 * | 4/2012 | Guglielmin | F04D 29/388 416/241 R |
| 2012/0082783 A1 | 4/2012 | Barnett et al. | |
| 2012/0241325 A1 * | 9/2012 | Huebel | C25D 7/0657 205/80 |
| 2014/0109546 A1 * | 4/2014 | Drozdenko | F01D 21/14 60/39.091 |
| 2014/0161617 A1 | 6/2014 | Chatenet et al. | |
| 2015/0093504 A1 * | 4/2015 | Brasher | B05D 5/00 427/230 |
| 2015/0132539 A1 * | 5/2015 | Bailey | C23C 16/34 428/141 |
| 2016/0153287 A1 * | 6/2016 | Roach | C25D 7/00 415/119 |

OTHER PUBLICATIONS

European Office Action, European Application No. 15182617.9-1373, dated Mar. 16, 2017, 5 pages.
Extended European Search Report, European Application No. 15182617.9-1373, dated Mar. 18, 2016, 20 pages.
Partial European Search Report, European Patent Application No. 15182617.9-1359, dated Nov. 26, 2015, 8 pages.
Li, James C. M.; Chapter 5.4 Deformation Mechanisms of Nanocrystalline Metals; Mechanical Properties of anocrystalline Materials; 4 pages; 2011; Pan Stanford Publishing Pte. Ltd.; Singapore.

* cited by examiner

COMPOSITE FAN SLIDER WITH NANO-COATING

CROSS REFERENCE TO RELATED APPLICATIONS

This application claims priority to and the benefit of U.S. Provisional Patent Application 62/043,776 filed Aug. 29, 2014, the disclosure of which is now expressly incorporated herein by reference.

FIELD OF THE DISCLOSURE

The present disclosure relates to retention devices for fan blades of a fan assembly of a gas turbine engines, and particularly to a fan slider for retention of such fan blades.

BACKGROUND

Gas turbine engines generally include a fan assembly and an engine core. The engine core includes a compressor section, a combustion section, and a turbine section including a plurality of rotation blades. The turbine section is driven by expansion of exhaust gases from the combustion section. The expanding exhaust gases rotate the turbine section which is coupled to drive rotation thereof. The fan assembly includes fans blades that are secured to a fan rotor.

SUMMARY

The present disclosure may comprise one or more of the following features and combinations thereof.

According to an aspect of the present disclosure, a fan slider for mounting on a gas turbine engine includes a body, and a coating disposed on the exterior surface of the body, the coating comprising nanocrystalline metallic material.

In some embodiments, the body has an exterior surface that includes an upper surface formed to include a central groove defined therein. In some embodiments, the coating covers substantially all of the body.

In some embodiments, the fan slider includes a metallic return spring arranged within the central groove to urge a fan blade towards an outer diameter of a fan wheel when the fan slider is assembled into a fan assembly.

In some embodiments, the metallic return spring is coupled to the coating by one of an adhesive, a weld, or a fastener.

In some embodiments, the coating has a thickness from about 0.001-0.150 inches at all points along the exterior surface of the fan slider body.

In some embodiments, the body is formed of a polymer selected from the group consisting of polyether ether ketone, acrylonitrile butadiene styrene, polyethylenimine, and Nylon GF. In some embodiments, the coating comprises nickel-based alloy coating.

In some embodiments, the body includes a plurality of bores defined therein and extending through the body between an upper surface and a lower surface.

In some embodiments, the coating is disposed within the bores to fill the bores and provide reinforcement pins that extend through the body.

According to another aspect of the present disclosure, a method of making a fan slider for use in a fan assembly to push a fan blade radially outward of a rotating axis of the gas turbine engine includes forming a body with a polymer; and coating an exterior surface of the body with a nanocrystalline metallic coating.

In some embodiments, forming the fan slider body is selected from the group consisting of injection molding and extruding.

In some embodiments, the polymer is selected from the group consisting of polyether ether ketone, acrylonitrile butadiene styrene, polyethylenimine, and Nylon GF.

In some embodiments, the nanocrystalline coating is nickel-based alloy coating.

In some embodiments, the method includes, before coating the body, forming bores penetrating through the body.

In some embodiments, the step of coating the body includes filling the bores with the nanocrystalline metallic coating to form reinforcement pins that extend through the body.

In some embodiments, the method includes, after the step of coating the body, removing the polymer from the nanocrystalline metallic coating.

According to another aspect of the present disclosure, a method of making a fan slider for use in a fan assembly to push a fan blade radially outward of a rotating axis of the gas turbine engine includes forming a fan slider body with a polymer, forming holes through the fan slider body, coating the fan slider body with a nanocrystalline metallic coating, wherein the nanocrystalline metallic coating also fills the holes formed through the fan slider body; and removing the fan slider body by heating the polymer that makes up the fan slider body to leave a shell of the nanocrystalline coating.

In some embodiments, the method includes mounting a slider spring to the shell. In some embodiments, the step of coating the body includes filling the holes with the nanocrystalline coating to form reinforcement pins that extend through the body.

Additional features and advantages of the fan slider will become apparent to those skilled in the art upon consideration of the following detailed description of the illustrated embodiment exemplifying the best mode of carrying out the invention as presently perceived.

BRIEF DESCRIPTION OF DRAWINGS

The present disclosure will be described hereafter with reference to the attached drawings which are given as non-limiting examples only, in which.

These and other features of the present disclosure will become more apparent from the following description of the illustrative embodiments.

DETAILED DESCRIPTION

For the purposes of promoting an understanding of the principles of the disclosure, reference will now be made to a number of illustrative embodiments illustrated in the drawings and specific language will be used to describe the same.

Figure 1:
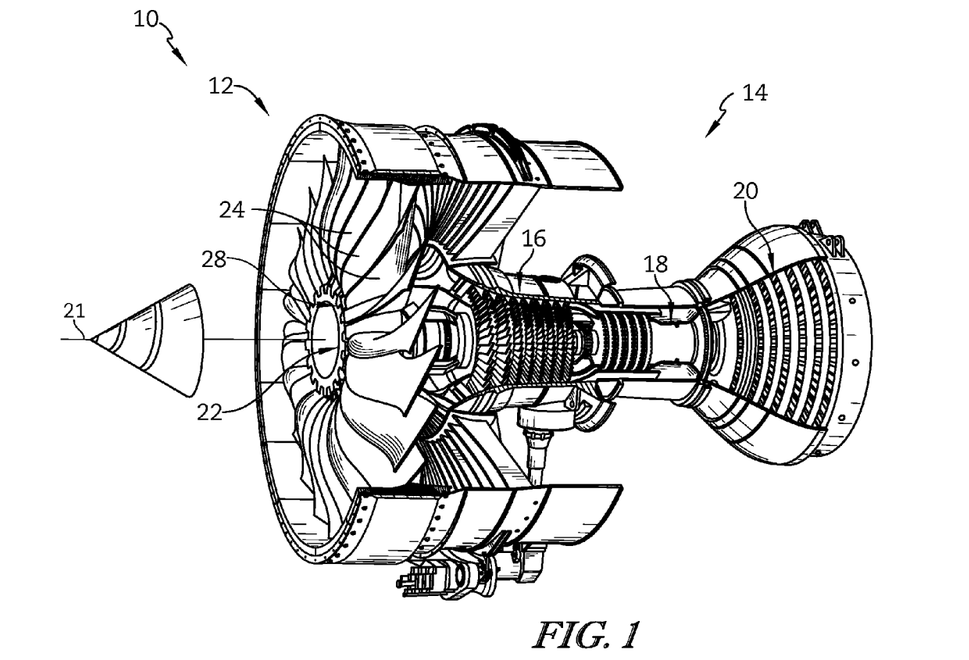
FIG. 1 is a perspective view of a gas turbine engine according to the present disclosure with its nose cone in exploded view and with a portion cutaway to show the turbine engine includes a fan assembly having a fan blades connected to a fan rotor, and an engine core having a compressor section, a combustion section, and a turbine section.

An illustrative gas turbine engine 10 is cut away to show that the engine 10 includes a fan assembly 12 and an engine core 14 adapted to drive the fan assembly 12 as shown in FIG. 1. The gas turbine engine 10 is illustratively adapted to provide propulsion for use, for example in an aircraft, and the fan assembly is adapted to push intake air to the engine core 14 for such use. The engine core 14 includes a compressor 16, a combustor 18, and a turbine 20 as shown in FIG. 1. The compressor 16 compresses and delivers air to the combustor 18. The combustor 18 mixes fuel with the compressed air received from the compressor 16 and ignites the fuel. The hot, high-pressure exhaust products of the combustion reaction in the combustor 18 are directed into the turbine 20 and the turbine 20 extracts work to drive the compressor 16 and the fan assembly 12.

The fan assembly 12 includes a fan rotor 22 having a plurality of fan blades 24 attached thereto as suggested in FIG. 1. The fan rotor 22 illustratively includes a plurality of slots 26 disposed along the outer circumference thereof. The fan blades 24 are illustratively attached to the fan rotor 22 by insertion of a radially inward end 27 of each fan blade 24 into one of the plurality of slots 26 as illustratively suggested in FIG. 2.

Figures 2, 3:
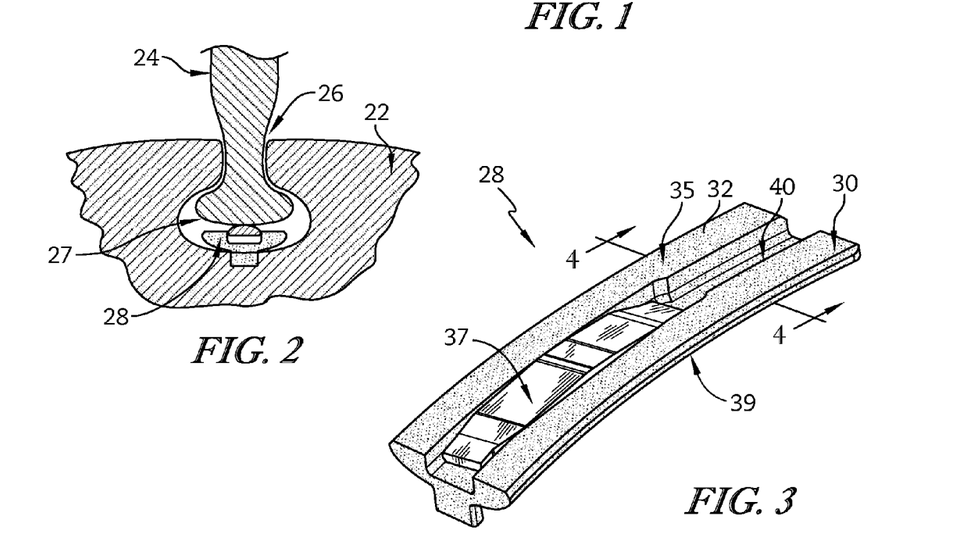
FIG. 2 is a front view of an illustrative embodiment of a portion of the fan assembly of the gas turbine engine of FIG. 1 according to the present disclosure showing that the fan blades are attached to the fan rotor by insertion into a slot within the fan rotor and showing that the fan blade is pushed towards an outer diameter of the fan rotor by a fan slider.
FIG. 3 is a perspective view of an illustrative embodiment of the fan slider of FIG. 2 according to the present disclosure showing that the fan slider includes a nanocrystalline coating disposed on a body and a spring positioned in a groove of the body.

The fan assembly 12 includes a fan slider 28 for urging a corresponding fan blade 24 radially outward of the fan rotor 22 as illustratively suggested in FIG. 2. The fan slider 28 illustratively includes a slider body 30, a coating 32, and a spring 37. The spring 37 is disposed on the coating 32 and arranged within a central groove 40 defined by the body 30. The body 30 is illustratively formed from polymer. A coating 32 is disposed on an exterior surface 34 of the body 30 as suggested in FIGS. 3 and 4.

Figure 4A:
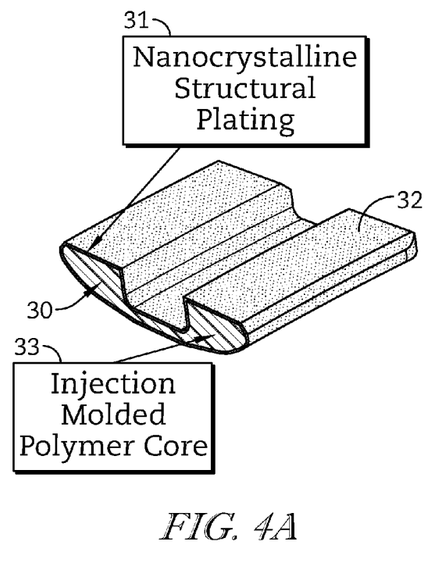
FIG. 4A is a perspective view of the fan slider of FIG. 3 cut away along the line 4-4 and showing that the fan slider includes a polymer body and a nanocystalline coating disposed on the exterior surface of the body.

The coating 32 is illustratively embodied as a nanocrystalline metallic coating configured to form nanocrystalline structural plating 31 as suggested in FIG. 4A. Nanocrystalline, for the purpose of this disclosure, is defined as a polycrystalline having a grain size generally of 100 nm or less, but functional equivalents above the 100 nm threshold may suffice depending on their specific characteristics. In some embodiments, the coating may be applied by electroplating and may include NANOVATE®, for example one or more of N1210, N1010, N2020, and N2025. The use of a nanocrystalline coated body can provide a light-weight, high-strength fan slider 28 with good corrosion and impact resistance for cost-effective use in gas turbine engines. In some embodiments, the coating 32 may comprise a nickel-based alloy.

Figure 4B:
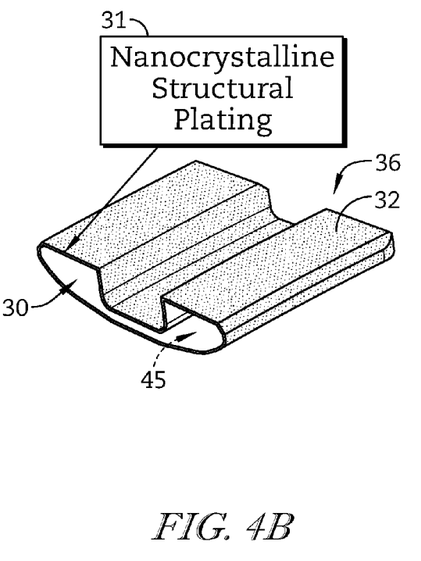
FIG. 4B is a perspective view of another embodiment of the fan slider of FIG. 3 cut away along the line 4-4 and showing that the fan slider includes a nanocystalline coating forming a hollow shell.

In some embodiments, as suggested in the cross-section shown in FIG. 4B, the body 30 of the slider 28 may be leached from within the coating 32 to leave a shell 36. The shell 36 is illustratively formed of the coating 32 defining a hollow space inside where the body 30 had previously been as suggested in FIG. 4B. In some embodiments, the hollow space may be filled in with another material 45, such as polymer or metallic foam, after leaching of the core of the body 30 to provide additional support to the shell 36.

Figure 5:
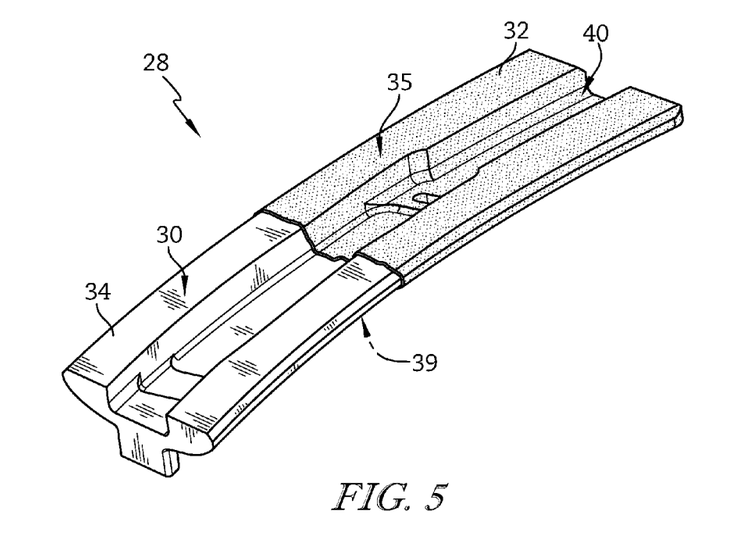
FIG. 5 is a perspective view of the fan slider of FIG. 3 without the spring and with a portion of the coating cutaway to show the polymer body.

The illustrative fan slider 28 shown in FIG. 5 includes a partial cutaway of the coating 32. The slider body 30 is formed of a core of material, illustratively an injection molded polymer core 33 as shown in FIG. 4A. In some embodiments, the polymer core may include one or more of polyether ether ketone (PEEK), acrylonitrile butadiene styrene (ABS), polyethylenimine (PEI), and nylon GF. In some embodiments, the slider body 30 may be formed of a core of any base material suitable for receiving a nanocrystalline coating for use in the gas turbine engine 10. In some embodiments, the body 30 may be formed of a core which has a melting temperature of less than that of the coating. In some embodiments, the body 30 may be formed of a core which has a melting temperature of less than 200° F., and in some embodiments, from about 150 to 200° F.

The coating 32 is disposed on the exterior surface 34 of the slider body 30 as suggested in FIGS. 3-5. The coating 32 is illustratively disposed to cover the entire exterior surface 34 of the slider body 30 and is illustratively embodied to have uniform coating thickness at all points on the exterior surface 34. The coating thickness is illustratively within a range of about 0.001 to 0.150 inches, and preferably about 0.001 to 0.125 inches. In some embodiments, the coating thickness may be varied at different locations along the slider body 30 according to manufacturing, operational, and/or performance requirements of the fan slider 28. For example, the thickness of the coating 32 on the bottom side (radially inner side) 39, within central channel 40 formed in upper surface (radially outer side) 35, and other contact areas of the fan slider 28 may be thicker than that along areas of the fan slider 28 not in contact with components during operation. Thicker coating along the contact areas of the fan slider 28 may increase resistance to impacts during operation of the engine 10. In some embodiments, a rubberized coating may be applied onto the coating 32.

Figure 6:
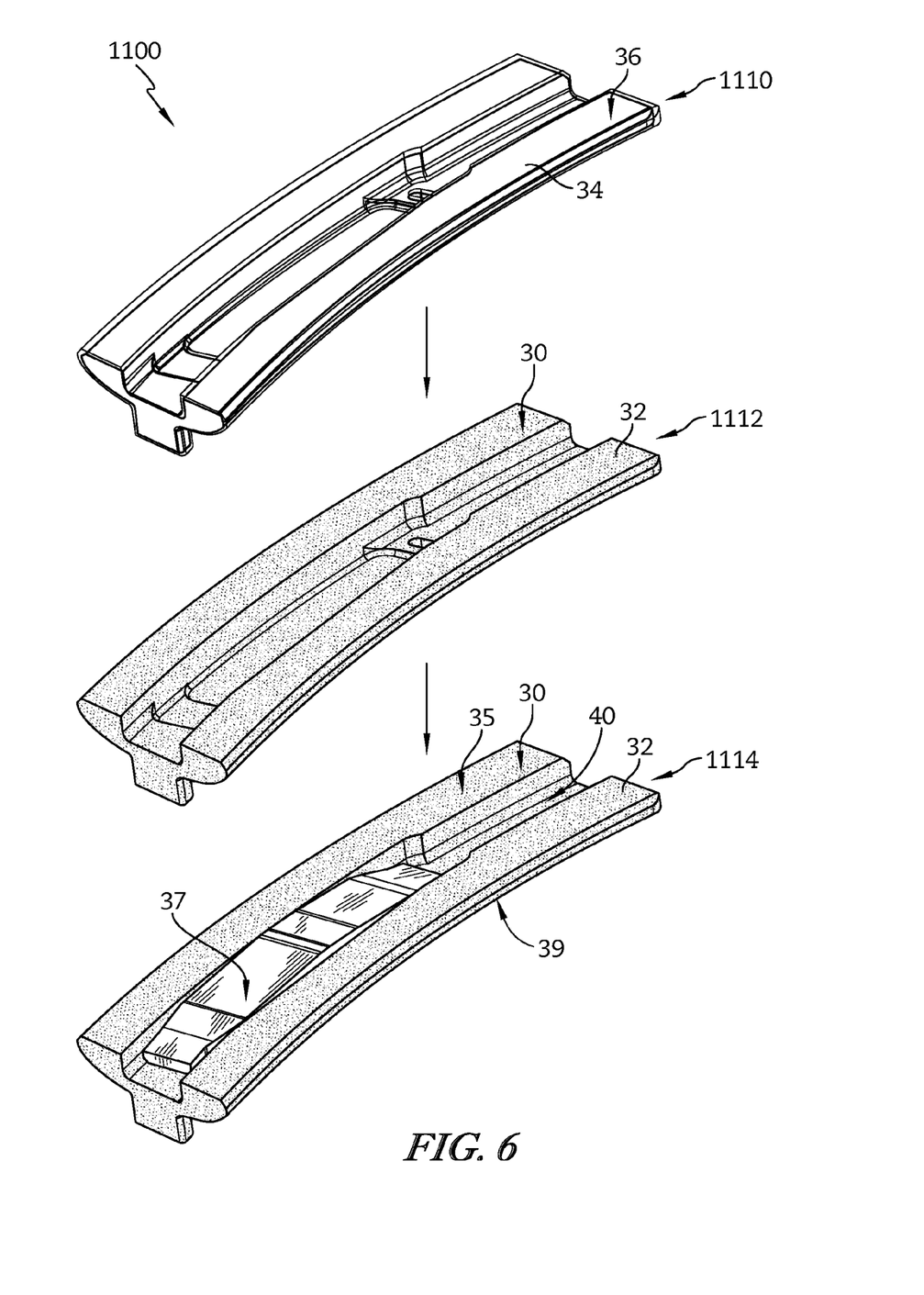
FIG. 6 is an illustrative flow process of making the fan slider of FIG. 3 showing the steps of forming a body of a polymer, coating an exterior surface of the body with a nanocrystalline coating and mounting a spring to the nanocrystalline coating.

As suggested in the illustrative flow process 1100 of FIG. 6, the fan slider 28 is illustratively formed in stages 1110, 1112, 1114 depicted from top to bottom including forming the body 30, coating the body 30, and arranging the spring 37. In the stage 1110 the slider body 30 is illustratively formed of a polymer core by injection molding to have the exterior surface 34 (a phantom coating 32 is shown in dotted line for comparison to the slider body 30). In some embodiments, the slider body 30 may be formed by any suitable process such as extrusion.

In stage 1112, the slider body 30 is illustratively coated with a nanocrystalline coating 32. The coating 32 is illustratively disposed by electroplating on the exterior surface 34 of the slider body 30. In some embodiments, the coating 32 may be applied by any suitable manner of depositing the coating 32 on the body 30 for use in the fan slider 28, such as spraying.

In stage 1114, a spring 37 is arranged on the coating 32 to provide resilient urging of the fan blades 24 towards an outer diameter of the fan rotor 22. The spring 37 is positioned in central groove 40 on the coating 32 and is affixed to the coating 32 by epoxy. The spring 37 is illustratively formed of titanium but may be formed of any suitable material for providing resilient urging of the fan blades 24. In some embodiments, the spring 36 may be attached to the fan annulus slider 28 by any suitable manner such as mechanical fastening or may be arranged in the groove without affirmative attachment to the slider 28.

Figure 7:
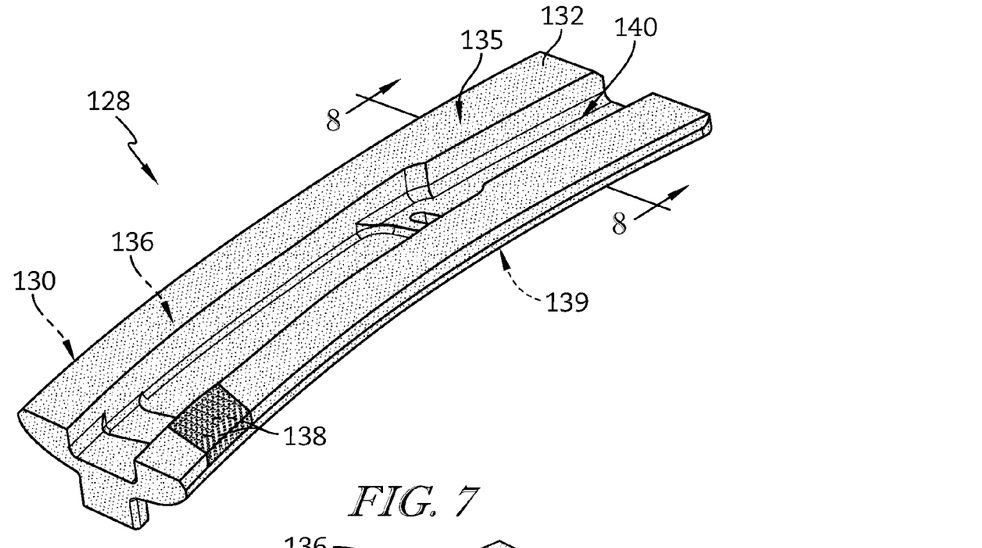
FIG. 7 is a perspective view of another fan slider adapted for use in a fan assembly with the spring removed and showing reinforcement posts (phantom) within the body.

An illustrative embodiment of another fan slider 128 is shown in FIG. 7. In the figures, and as used herein, generally like-features of different embodiments are denoted by like-reference numerals in the 100 series, and the description that follows generally describes additions and/or differences in the various features unless otherwise indicated.

Figures 8A, 8B:
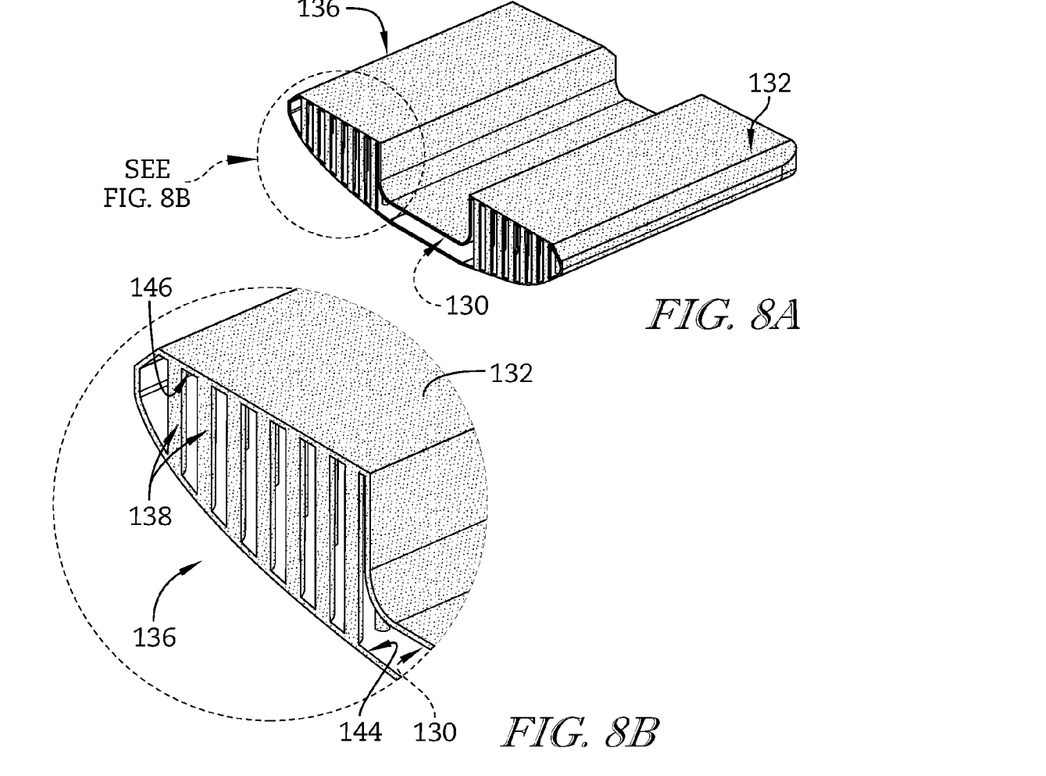
FIG. 8A is a perspective view of a cross-section taken of the fan slider of FIG. 7 along the line 8-8 and showing that a nanocrystalline coating forms a shell and reinforcement pins.
FIG. 8B is a magnified perspective view of a portion of the slider of FIG. 8A showing the nanocrystalline shell, the reinforcement pins, and the hollow cavity defined by the shell and reinforcement pin.

Fan slider 128 includes a coating 132 that forms a structural shell 136 as suggested in FIGS. 7, 8A, and 8B. A temporary body 130 provides an exterior surface 134 for disposition of the coating 132 before being leached out to leave the shell 136. The coating 132 is illustratively disposed on the entire exterior surface 134 and illustratively includes a nanocrystalline coating.

As suggested in the illustrative embodiment of FIGS. 8A and 8B, the body 130 may include reinforcement pins 138 extending through the cavity to reinforce the shell 136. The reinforcement pins 138 are illustratively formed of the nanocrystalline coating 132. In the illustrative embodiment, the reinforcement pins 138 are formed by forming bores 142 through the core of the body 130 and filling the bores 142 with the coating 132. By forming reinforcement pins 138 within the body 130 and removing the core, the shell 136 is strengthened while remaining lightweight. In some embodiments, the hollow cavity may be partly or wholly filled in with a material to provide additional support to the shell 136.

As suggested in FIGS. 8A and 8B, the reinforcement pins 138 are illustratively embodied as cylindrical, generally uniform, evenly distributed along the axial length of the fan slider with respect to the gas turbine engine rotating axis 21, and being placed in some areas but not others (i.e., not within the groove 140). In some embodiments, the reinforcement pins 138 may take any shape, size, configuration and or distribution, and be placed in any portion of the slider 128, to provide support to the shell 136. In some embodiments, the number, shape, size, configuration and or distribution of reinforcement pins 138 in an area may vary according to the location on the slider 128 based on performance requirements, for example, higher loading areas may have a different number, shape, size, configuration and or distribution of reinforcement pins 138 that lower loading areas.

Figures 9, 9A, 9B:
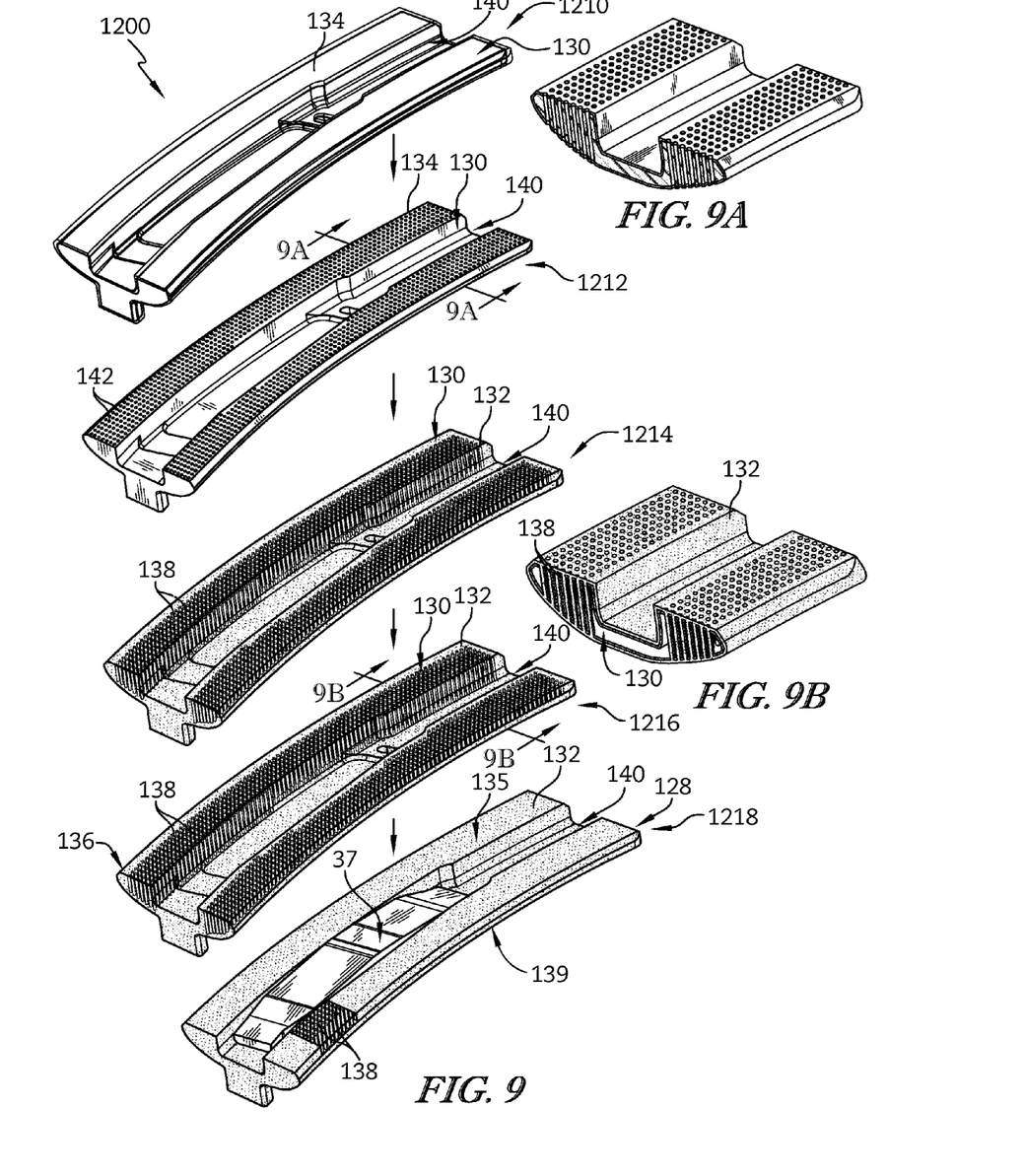
FIG. 9 is an illustrative flow process of making the fan slider of FIG. 7 showing the steps of forming a body of a polymer, forming bores through the body, coating an exterior surface of the body with a nanocstalline coating and filling in the bores to form reinforcement pins, leaching the polymer from the interior to form a shell made from the nanocrystalline coating, and mounting a spring to the nanocrystalline coating.
FIG. 9A is a perspective cross-section taken along the line 9A-9A of a stage of FIG. 9 showing the bores formed in the slider body.
FIG. 9B is a perspective cross-section taken along the line 9B-9B of a stage of FIG. 9 showing the reinforcement pins and hollow cavity within the shell.

As suggested in the illustrative flow process 1200 of FIG. 9, the fan slider 128 is formed in stages 1210, 1212, 1214, 1216, 1218 depicted from top to bottom, including forming the body 130 from a polymer, forming bores 142 in the body 130, coating the body 130 with the coating 132 and filling the bores 142 with the coating 130 to form the reinforcement pins 138, and leaching out the core from within the body 130. In stage 1210, forming the body 130 illustratively includes injection molding the body 130 from a polymer core.

In stage 1212, forming bores 142 in the body 130 includes drilling bores 142 through the body 130. In some embodiments, bores 142 may be formed by any suitable manner such as being molded in place. A cross-section taken along the line 9A-9A as suggested in FIG. 9A shows that the bores 142 illustratively penetrate through the body 130.

In stage 1214, the coating 130 is applied to an exterior surface 134 of the body 130 and the coating 132 fills the bores 142 to form the reinforcement pins 138. The reinforcement pins 138 are illustratively formed of coating 130 filling the bores 142 and extending through the body 130 to connect on one end of each reinforcement pins 138 with an inner side 144 of the coating 130 and to connect on another end with another inner side 146 of the coating 130 as suggested in FIGS. 8A-8B. At this point in flow process 1200, the reinforcement pins 138 have been formed but the core still occupies the body 130 as it has not been leached out.

In stage 1216, the core of the body 130 is leached out to leave shell 136 formed of the coating 130. The stage of leaching is illustratively embodied as heating the slider 128 to a temperature of the 200° F. (illustratively the melting point of the core of the body 130), and specifically less that 400° F. (illustratively the functional limitation of the coating 132). In some embodiments, leaching may be performed in any suitable manner, for example dissolving. In the cross-section taken along line 9B-9B, as suggested in FIG. 9B, the core has been leached out from the body 130 to leave the shell 136 and such that the body 130 includes a hollow cavity with the reinforcement pins 138 remaining to provide structural support to the shell 136. In some embodiments, the hollow space may be filled in with a material to provide additional support to the shell 36.

In stage 1218, the spring 37 is arranged in the groove 140 and illustratively affixed to the coating 132 with epoxy. The resultant slider 128 is lightweight and high strength with corrosion and impact resistance suitable for urging a fan blade radially outward towards an outer diameter of a fan rotor.

Although the present disclosure has been described with reference to particular means, materials, and embodiments, from the foregoing description, one skilled in the art can easily ascertain the essential characteristics of the present disclosure, and various changes and modifications may be made to adapt the various uses and characteristics without departing from the spirit and scope of the present disclosure.

What is claimed is:

1. A fan slider for mounting on a gas turbine engine, the fan slider comprising:

a body including a plurality of bores defined therein and extending through the body between an upper surface and a lower surface; and a coating disposed within the plurality of bores, forming reinforcement pins, and on an exterior surface of the body, the exterior surface including the upper surface and the lower surface, the coating comprising nanocrystalline metallic material.

2. The fan slider of claim 1, wherein the body has an exterior surface that includes an upper surface formed to include a central groove defined therein.

3. The fan slider of claim 2, wherein the coating covers substantially all of the body.

4. The fan slider of claim 2, further comprising a metallic return spring arranged within the central groove to urge a fan blade towards an outer diameter of a fan wheel when the fan slider is assembled into a fan assembly.

5. The fan slider of claim 4, wherein the metallic return spring is coupled to the coating by one of an adhesive, a weld, or a fastener.

6. The fan slider of claim 1, wherein the coating has a thickness from about 0.001-0.150 inches at all points along the exterior surface of the fan slider body.

7. The fan slider of claim 1, wherein the body is formed of a polymer selected from the group consisting of polyether ether ketone, acrylonitrile butadiene styrene, polyethylenimine, and Nylon GF.

8. The fan slider of claim 1, wherein the coating comprises nickel-based alloy coating.

9. A method of making a fan slider for use in a fan assembly to push a fan blade radially outward of a rotating axis of a gas turbine engine, the method comprising the steps of:

forming a body of a polymer;
forming bores penetrating through the body; and
coating an exterior surface of the body with a nanocrystalline metallic coating
including filling the bores with the nanocrystalline metallic coating and forming reinforcement pins that extend through the body.

10. The method of claim 9, wherein forming the fan slider body is selected from the group consisting of injection molding and extruding.

11. The method of claim 9, wherein the polymer is selected from the group consisting of polyether ether ketone, acrylonitrile butadiene styrene, polyethylenimine, and Nylon GF.

12. The method of claim 9, wherein the nanocrystalline coating is nickel-based alloy coating.

13. The method of claim 9, further comprising, after the step of coating the body, removing the polymer from the nanocrystalline metallic coating.

14. A method of making a fan slider for use in a fan assembly to push a fan blade radially outward of a rotating axis of a gas turbine engine, the method comprising the steps of:

forming a fan slider body of a polymer;
forming holes through the fan slider body;
coating the fan slider body with a nanocrystalline metallic coating including filling the holes formed through the fan slider body with the nanocrystalline metallic coating; and
removing the fan slider body from the fan slider by heating the polymer that makes up the fan slider body and leaving a shell of the nanocrystalline coating.

15. The method of making a fan slider of claim 14, further comprising mounting a slider spring to the shell.

16. The method of making a fan slider of claim 14, wherein filling the holes with the nanocrystalline coating forms reinforcement pins that extend through the body.

* * * * *